United States Patent Office 2,944,974
Patented July 12, 1960

2,944,974

LUBRICATING OIL COMPOSITIONS

Lyman Edward Lorensen, Orinda, and John Zachar and Robert Caldwell Jones, Berkeley, Calif., assignors to Shell Oil Company, a corporation of Delaware No Drawing. Filed Dec. 31, 1956, Ser. No. 631,419

7 Claims. (Cl. 252—51.5)

This invention relates to new and improved mineral oil lubricating compositions containing a high molecular weight non-ash forming polymer, these lubricating compositions possessing particularly good detergent, pour point-depressing and viscosity index-improving properties, and to said polymers per se.

In copending application Serial No. 610,405, filed September 17, 1956 and which has matured into U.S. Patent 2,889,282, there are described mineral oils containing oil-soluble polymeric compounds of at least three polymerizable monomers one of which is a vinylpyridine and there are at least two dissimilar acrylate esters of dissimilar long chain aliphatic alcohols containing at least 10 carbon atoms, with the average chain length of the alkyl radical of the ester mixture being in the $C_{10}$ to $C_{16}$ range. Polymeric compounds of this type possess excellent pour point depressing properties for various mineral oil stocks.

It has now been found that the detergent and viscosity index improving properties of such polymers can be greatly enhanced, without sacrificing their good pour point properties, by replacing a portion of one or more of the ester long chain alkyl radicals with an alkyl radical of not more than 4 carbon atoms.

More specifically, it has now been found that an excellent mineral oil having improved detergency, pour point and viscosity index or viscosity-temperature properties is provided by a mineral oil containing a minor amount of a polymer of a number of polymerizable monomers, which are (1) a vinylpyridine, (2) at least two dissimilar acrylates, preferably methacrylates of dissimilar long chain aliphatic alcohols containing at least 10 and not more than 20 carbon atoms, with an average chain length of these alkyl side chains in these ester mixtures being in the $C_{10}$–$C_{16}$ and preferably in the $C_{12}$–$C_{14}$ range, and (3) at least one acrylate, preferably methacrylate, ester of a lower aliphatic alcohol of not more than 4 carbon atoms, the amount of the acrylate ester of the lower alcohol in the polymer mixture being such that the final product is at least soluble in the oil to the extent of 0.1% and preferably to 1% under storage conditions and preferred is when the lower ester is from about 10 to about 60 mol percent of the total of higher ester mixture. The mol ratio of the vinylpyridine to the total polymerizable esters can vary from 2:1 to 1:10 and the dissimilar acrylate esters of the long chain alkanols can vary in the mol ratio range of 1:4 to 4:1. The final polymer should have a molecular weight varying from about fifty thousand to about two and one-half million and preferably between 100,000 and 850,000 as determined by the light scattering method and the average molecular weight consisting of the higher molecular constituents. More specifically, it has been found that polymers of a vinylpyridine and mixtures of higher esters of methacrylic acid and dissimilar long chain aliphatic alcohols and a lower acrylate or methacrylate ester of an alkanol having not more than 4 carbon atoms as described above exhibit detergent, pour point depressant and viscosity index activity which is far greater than that of the corresponding copolymers of a vinylpyridine with a single ester of methacrylic acid and a long chain aliphatic alcohol.

The vinylpyridines used in making the polymers are exemplified by 2-vinylpyridine, 3-vinylpyridine, 4-vinylpyridine, as well as the ring substituted alkyl derivatives thereof, e.g., 2-methyl-5-vinylpyridine, 4-methyl-2-vinylpyridine, 5-ethyl-2-vinylpyridine and 2-butyl-5-vinylpyridine and the like.

The long chain alkyl acrylate ester monomers are the acrylic and methacrylic acid esters of long chain aliphatic alcohols which include straight or branched-chain alcohols, e.g., decyl, dodecyl, tetradecyl, hexadecyl, octadecyl and eicosyl alcohols or a mixture of them as in technical lauryl alcohol. Specific mixture combinations of these esters include dodecyl methacrylate/octadecyl methacrylate, tetradecyl acrylate/octadecyl methacrylate, decyl methacrylate/octadecyl methacrylate, tetradecyl methacrylate/hexadecyl methacrylate, technical lauryl methacrylate/octadecyl methacrylate, these ester mixtures being employed in a mol ratio of from 1:4 to 4:1, respectively, and so controlled that the average chain length of the alkyl radicals in the final polymer is in the range indicated above.

The acrylate or methacrylate esters of the lower aliphatic alcohols, are derived from methyl, ethyl, propyl, or butyl alcohols.

An ester of acrylic or methacrylic acid and technical lauryl alcohol, which is a mixture of straight chain alcohols should not be considered as a mixture of two or more esters of group (2) or that using such an ester would result in a polymeric additive suitable for use in oil compositions of this invention since copolymers of lauryl (technical) methacrylate and a vinylpyridine will not have the required ratio of dissimilar alkyl chains or the average alkyl chain length which is required of polymers of this invention. Rather such copolymers function as simple copolymers and possess the limitations of such esters namely they function as pour point depressants only in specific oils, they tend to break down, form emulsion and cause corrosion. On the other hand, polymers derived from suitable proportions of a vinylpyridine and a mixture of lauryl methacrylate (derived from technical lauryl alcohol) octadecyl (stearyl) methacrylate and methyl methacrylate form excellent pour point depressants, detergents, and viscosity index improving additives for use in lubricating oil compositions.

Any suitable method may be employed to make the polymers of the present invention. Factors which exert an influence on the molecular weight of the polymer include the method of polymerization (e.g., polymerization in emulsion, suspension, solvent solution or bulk), the nature and concentration of the catalyst employed, the temperature and nature and amount of the monomers. When the polymerization is accomplished in solution, the molecular weight of the product will be lower when the dilution is greater, i.e., when the concentration of solvent is greater. With the same catalyst, the higher polymerization temperature tends to give lower molecular weights.

Polymerization initiators that are particularly suited for use in preparing the polymers include various free radical yielding catalysts such as, for example, benzoyl peroxide, lauryl peroxide, tertiary butyl hydroperoxide, 2,2-bis(tertiary butyl peroxy) butane, di(tertiary butyl) peroxide, hydrogen peroxide, sodium or potassium persulfate, sodium or potassium percarbonate, peracetic acid and the like. Other suitable catalysts include sodium bisulfite, diethyl sulfoxide, azo compounds, such as alpha, alpha-azodiisobutylonitrile and the like. The amount of the initiator added may vary over a considerable range. In general, the amount of initiator added will vary from 0.1% to 5% by weight of the material being polymerized. Preferred amounts vary from 0.1% to 2% by weight.

The temperature selected will vary depending chiefly on the type of initator selected, the desired rate of reaction and the molecular weight desired. Generally, the temperature will range from about 50° C. to 150° C., and more preferably from 60° C. to 150° C.

The polymerization may be conducted in the presence or absence of air. In most cases, however, it has been found desirable to conduct the polymerization in the absence of air, e.g., in the presence of an inert gas such as nitrogen. Atmospheric, reduced or superatmospheric pressure may be employed.

At the end of the polymerization, any unreacted monomer or monomers and/or solvents may be removed, preferably by distillation or by precipitation with appropriate solvents.

To obtain copolymers wherein the greatest part of their macromolecules have the same composition and thus display their superior properties to the highest extent, it is preferred to keep the concentrations of the monomers constant as well as the ratio of concentrations constant. This is preferably obtained by adding all of the monomers at the rate at which they are consumed. This greatest uniformity of conditions is generally obtained in a continuous process whereby polymerization takes place in a space from which the polymer is drained off at the rate at which it is formed and in which the feed of monomers and other substances employed in the polymerization exactly compensate for the consumption and drainage taking place when the polymer is removed.

Control over the change of ratio can be made by periodic withdrawal of sample and analyzing the product or in a homogeneous system by simply observing a physical property of the mixture which varies with the ratio of concentrations of monomers, such as boiling point, refractive index, vapor pressure, specific gravity, and the like, and adding the monomer or monomers so as to bring the value up to the predetermined level for the desired product. This adjustment of the rate of addition can be and sometimes preferably is controlled by some automatic means. In the event that the boiling temperature of the mixture is the method employed in determining the rate of addition, one may use the effect of the varying temperature on the resistance of a metal wire forming part of circuit incorporating a Wheatstone bridge. In this circuit an electric or electronic potentiometer can be inserted which is connected with an electric, pneumatic or hydraulic regulating system controlling a pump or valve in the feed line through which the addition takes place.

The mineral lubricating oils used in compositions of this invention can be obtained from any paraffinic, naphthenic, asphaltic or mixed base crude, and/or mixtures thereof. The viscosity of these oils may vary over a wide range, such as from 100 SUS at 100° F. to 100 SUS at 210° F. The hydrocarbon oils may be blended with fixed oils such as castor oil, lard oil and the like and/or with synthetic lubricants such as polymerized olefins, copolymers of alkylene glycols and the alkylene oxides, organic esters, e.g., 2-ethylhexyl sebacate, silicone polymers, e.g., dimethyl silicone polymers and the like.

Mineral lubricating oils which are particularly desirable for use in compositions of the invention can be obtained from West Texas Ellenburger crudes, East Texas crudes, Oklahoma crudes, California crudes. A useful solvent refined East Texas mineral lubricating oil had the following properties:

Pour point, ° F. _____ +10
Viscosity, centistokes at 100° F. _____ 27
Viscosity index _____ 95

The novel polymer additives are effective in the lubricating compositions in ranges varying from about 0.1% to about 10% and preferably from about 1% to 5% by weight of the oil.

The following examples illustrate polymer additives which are useful in compositions of the invention:

EXAMPLE I

A mixture of 2.52 mol of stearyl methacrylate, 5.04 mol of lauryl methacrylate, 0.83 mol of methyl methacrylate and 1 mol of 2-methyl-5-vinylpyridine and 0.2% wt. of alpha,alpha'-azodi-isobutylronitrile dissolved in a minor amount of acetone for solubility was placed in a reaction vessel and reacted for about 24–48 hours at 65° C. with stirring in a nitrogen atmosphere. The polymer was then dispersed in equal volumes of benzene and thereafter precipitated with 5–10 volumes of a mixture of acetone and methanol. This was repeated and a stearyl methacrylate/lauryl methacrylate/methyl methacrylate/2-methyl-5-vinylpyridine polymer having a nitrogen content of 0.60% by weight and a molecular weight in excess of 750,000 was recovered.

Following essentially the procedure of Example I, other polymers were prepared from monomer mixtures in the molar proportions as shown in Table I.

*Table I*

| Example | SMA[1] | LMA[2] | MMA[3] | BMA[4] | MVP[5] | EVP[6] |
|---|---|---|---|---|---|---|
| II | 2.24 | 4.48 | 1.86 | | 1 | |
| III | 2.24 | 4.48 | | 1.86 | 1 | |
| IV | 2.05 | 3.92 | 2.43 | | 1 | |
| V | 2.05 | 3.92 | | 2.43 | 1 | |
| VI | 1.68 | 3.36 | 3.36 | | 1 | |
| VII | 1.68 | 3.36 | | 3.36 | 1 | |
| VIII | 1.40 | 2.80 | | 4.2 | 1 | |
| IX | 1.40 | 2.80 | 4.2 | | 1 | |
| X | 1.12 | 2.24 | 5.04 | | 1 | |
| XI | 1.12 | 2.24 | | 5.04 | 1 | |
| XII | 2.52 | 5.04 | 0.83 | | | 1 |
| XIII | 2.24 | 4.48 | | 1.86 | | 1 |
| XIV | 2.05 | 3.92 | 2.43 | | | 1 |
| XV | 2.05 | 3.92 | | 2.43 | | 1 |

[1] SMA = Stearyl methacrylate.
[2] LMA = Lauryl methacrylate.
[3] MMA = Methyl methacrylate.
[4] BMA = Butyl methacrylate.
[5] MVP = 2-methyl-5-vinylpyridine.
[6] EVP = 5-ethyl-2-vinylpyridine.

Other examples of useful polymers for the purpose of the invention include: dodecyl acrylate/stearyl acrylate/ ethyl methacrylate/vinylpyridine; hexadecyl methacrylate/stearyl methacrylate/propyl methacrylate/2-methyl-5-vinylpyridine, lauryl methacrylate/stearyl methacrylate/ethyl methacrylate/5-ethyl-2-vinylpyridine and decyl methacrylate/octadecyl methacrylate/butyl methacrylate/vinyl pyridine in which the mol ratios of the total ester mixture to the vinylpyridine are ratios of from 1:2 to 10:1, respectively, and in which the amounts of methyl, ethyl, propyl or butyl acrylate or methacrylate in the ester mixtures are amounts of from 10 to 60 and preferably from 15 to 45 percent of the total ester mixture.

The pour point and viscosity temperature properties which additives of this invention impart to mineral oil are shown by the data in Table II:

Table II

[Base oil-mixture of 20% 100 neutral and 50% 250 neutral, pour point=+10, V.I.=95.]

| Additive | Amount, Percent wt. | Pour Point, °F. (ASTM-D-97-47) | VT[1] |
|---|---|---|---|
| Example I | 1.5 | −45 | 115 |
| Example II | 1.5 | −45 | 126 |
| Example III | 2 | −45 | 116 |
| Example IV | 2 | −45 | 149 |
| Example V | 2 | −45 | 122 |
| Example VI | 2 | −45 | 178 |
| Example VII | 2 | −45 | 131 |
| Example VIII | 2 | −35 | 205 |
| Example IX | 2 | −40 | 142 |
| Example XI | 2 | −10 | 172 |
| Polymer SMA/LMA/MVP (2.8/5.6/1) | 2 | −45 | 104 |
| Copolymer of LMA/MVP (1.7/1) | 2 | +15 | 104 |
| Copolymer of SMA/MVP (4.3/1) | 2 | +20 | 104 |

[1] See following formula:

$$VT = \frac{\dfrac{\eta_{blend}^{210°F.} - \eta_{base\ oil}^{210°F.}}{\eta_{base\ oil}^{210°F.}}}{\dfrac{\eta_{blend}^{100°F.} - \eta_{base\ oil}^{100°F.}}{\eta_{base\ oil}^{100°F.}}} \times 100$$

Polymeric compounds of this invention are new and novel products which are particularly effective multifunctional additives in neat and compounded mineral lubricating oils which normally can contain minor amounts (0.01–2%) of corrosion inhibitors, extreme pressure agents, anti-oxidants and the like.

We claim as our invention:

1. A mineral lubricating oil composition comprising a major amount of mineral lubricating oil and a minor amount, sufficient to improve the pour point, viscosity index and detergency of the oil, of an oil-soluble copolymer of (1) a monovinyl-substituted pyridine of the group consisting of an unsubstituted vinylpyridine and derivatives of the said vinylpyridine having a lower alkyl group substituted on a ring carbon atom, (2) a mixture of a stearyl ester of an acrylic acid of the group consisting of acrylic acid and methacrylic acid and a lauryl ester of an acrylic acid of the group consisting of acrylic acid and methacrylic acid in the mol ratio varying from 1:4 to 4:1, respectively, and (3) a $C_{1-4}$ alkyl ester of an acrylic acid of the group consisting of acrylic acid and methacrylic acid in an amount of from 10 to 60 mol percent of the ester mixture of (2), the mol ratio of (1) and the ester mixture of (2) and (3) varying from 1:2 to 1:10, respectively said polymer having an average alkyl chain length of from $C_{12}$ to $C_{14}$ carbon atoms, the copolymer having a molecular weight of from about $5 \times 10^4$ to $2.5 \times 10^6$.

2. The composition of claim 1 wherein the ester mixtures are lauryl methacrylate and stearyl methacrylate said esters being present in the mol ratio of 1:4 to 4:1 and butyl methacrylate present in an amount of from about 15 to about 45 mol percent of the lauryl and stearyl methacrylate mixture and the mol ratio of the total ester mixture to the vinyl pyridine ranging from 1:2 to 10:1, respectively said polymer having an average alkyl chain length of from $C_{12}$ to $C_{14}$ carbon atoms.

3. The composition of claim 1 wherein the ester mixtures are lauryl methacrylate and stearyl methacrylate, said esters being present in the mol ratio of from 1:4 to 4:1 and methyl methacrylate present in an amount of from about 15 to about 45 mol percent of the lauryl and stearyl methacrylate mixture and the mol ratio of the total ester mixture to the vinyl pyridine ranging from 1:2 to 10:1, respectively said polymer having an average alkyl chain length of from $C_{12}$ to $C_{14}$ carbon atoms.

4. A mineral lubricating oil composition comprising a major amount of a mineral lubricating oil and a minor amount sufficient to decrease the pour point and improve the detergency and viscosity temperature properties of the oil, of a polymer of stearyl methacrylate/lauryl methacrylate/methyl methacrylate/2-methyl-5-vinylpyridine, the ester mol ratio of the stearyl methacrylate to lauryl methacrylate varying from 1:4 to 4:1, the methyl methacrylate varying from about 10 to about 60 mol percent of the stearyl and lauryl methacrylate ester mixture and the mol ratio of the total ester mixture to the 2-methyl-5-vinyl pyridine varying from 1:2 to 10:1, respectively, said polymer having an average alkyl chain length of from $C_{12}$ to $C_{14}$ for the long alkyl radicals and a molecular weight of from about 50 thousand to about 2.5 million.

5. A mineral lubricating oil composition comprising a major amount of a mineral lubricating oil and a minor amount sufficient to effectively decrease the pour point and improve the detergency and viscosity temperature properties of the oil of a polymer of stearyl methacrylate/lauryl methacrylate/butyl methacrylate/2-butyl-5-vinylpyridine, the ester mol ratio of the stearyl methacrylate to lauryl methacrylate varying from 1:4 to 4:1 the butyl methacrylate varying from about 10 to about 60 mol percent of the stearyl and lauryl methacrylate ester mixture and the mole ratio of the total ester mixture to the 2-methyl-5-vinyl pyridine varying from 1:2 to 10:1, respectively, said polymer having an average alkyl chain length of from $C_{12}$ to $C_{14}$ for the long alkyl radicals and a molecular weight of from about 50 thousand to about 2.5 million.

6. A mineral lubricating oil composition comprising a major amount of a mineral lubricating oil and a minor amount sufficient to decrease the pour point and improve the detergency and viscosity temperature properties of the oil, of a polymer of stearyl methacrylate/lauryl methacrylate/methyl methacrylate/2-methyl-5-vinylpyridine, the ester mol ratio of the stearyl methacrylate to lauryl methacrylate varying from 1:4 to 4:1, the methyl methacrylate varying from about 15 to about 45 mol percent of the stearyl and lauryl methacrylate ester mixture and the mol ratio of the total ester mixture to the 2-methyl-5-vinyl pyridine varying from 1:2 to 10:1, respectively, said polymer having an average alkyl chain length of from $C_{12}$ to $C_{14}$ for the long alkyl radicals and a molecular weight of from about 50 thousand to about 2.5 million.

7. A mineral lubricating oil composition comprising a major amount of a mineral lubricating oil and a minor amount sufficient to effectively decrease the pour point and improve the detergency and viscosity temperature properties of the oil of a polymer of stearyl methacrylate/lauryl methacrylate/butyl methacrylate/2-butyl-5-vinyl pyridine, the ester mol ratio of the stearyl methacrylate to lauryl methacrylate varying from 1:4 to 4:1 the butyl methacrylate varying from about 15 to about 45 mol percent of the stearyl and lauryl methacrylate ester mixture and the mole ratio of the total ester mixture to the 2-methyl-5-vinyl pyridine varying from 1:2 to 10:1, respectively, said polymer having an average alkyl chain length of from $C_{12}$ to $C_{14}$ for the long alkyl radicals and a molecular weight of from about 50 thousand to about 2.5 million.

References Cited in the file of this patent

UNITED STATES PATENTS

| | | |
|---|---|---|
| 2,653,133 | Catlin | Sept. 22, 1953 |
| 2,655,479 | Munday et al. | Oct. 13, 1953 |
| 2,666,044 | Catlin | Jan. 12, 1954 |
| 2,737,496 | Catlin | Mar. 6, 1956 |
| 2,798,063 | Fowler et al. | July 2, 1957 |
| 2,889,282 | Lorensen et al. | June 2, 1959 |